United States Patent Office 3,006,911
Patented Oct. 31, 1961

3,006,911
PRODUCTION OF ALCOHOL PHOSPHATES AND PRODUCTS
Tyunosin Ukita, Tokyo, Japan, assignor to Takeda Pharmaceutical Industries, Ltd., Osaka, Japan
No Drawing. Filed June 26, 1959, Ser. No. 823,002
Claims priority, application Japan June 28, 1958
16 Claims. (Cl. 260—211.5)

This invention relates to a new agent for preparing phosphates and to a new process involving the use of this agent for preparing phosphates from compounds having a suitable number of hydroxyl groups.

The agent, hydrobenzoin cyclic phosphorochloridate, representable by the formula

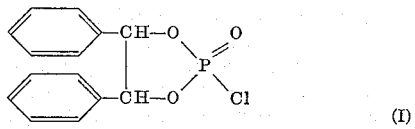

(I)

may be synthesized for example as follows: phosphorus oxychloride ($POCl_3$) is added to dry hydrobenzoin in the presence of an anhydrous pyridine base such as pyridine or picoline with cooling, after which the pyridine base is distilled off under reduced pressure at a considerably low temperature to separate the agent (I). This reagent occurs as white needle-like crystals and melts at a temperature of 160–161° C. It is a stable compound when kept at a low temperature protected from moisture. In view of a tendency toward instability, however, it is desirable that the agent (I) be used in freshly prepared state for preparing phosphates.

According to the present invention, the agent (I) can advantageously be used for preparing phosphates such as sugar phosphates and adenosine phosphate, which are useful as reagents for biochemical researches. The formation of the phosphates may generally be carried out in the following manner: Reaction between the agent (I) and a compound having a hydroxyl group and representable by the formula R—OH gives an intermediate compound, cyclic phosphate, representable by the formula

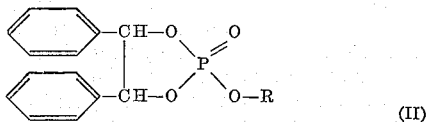

(II)

The compound (II) is then reduced or hydrolyzed to a phosphate representable by the formula

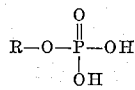

The primary object of the present invention is the embodiment of the new agent (I) for preparing phosphates, and a further object is to embody a new process for preparing phosphates by the use of the agent (I). The second object is realized by the above-mentioned procedure according to the present invention.

The compound to be reacted with the agent (I) for preparing the phosphate is an alcohol, and the alcohol may have one or more hydroxyl groups in the molecule. For example, aliphatic or aromatic alcohols may all be esterified by the method of this invention. Vitamin A alcohol, thiamine, riboflavine, steroid alcohol, mono- or polysaccharide, nucleosides, etc. are all usable as the starting material of this invention. When a specified hydroxyl group of a poly-hydroxy compound is to be esterified, the other hydroxyl groups should be protected by suitable blocking radicals. For example, hexose pentaacetate may be used when hexose monophosphate is desired, and the sugar moiety of adenosine may be protected by acetone when adenosine monophosphate is desired. The protection of the hydroxyl groups may be realized in conventional manner.

The reaction between the agent (I) and the hydroxylated compound may generally be conducted at room temperature (about 20° to about 30° C.) or under cooling. The reaction may be carried out in an inert solvent such as benzene, toluene, or the like. As the reaction is a kind of condensation reaction accompanied by dehydrochlorination, it is desirable to conduct the reaction in the presence of a basic agent such as pyridine, picoline, dimethylaniline, methylamine or the like for removing liberated hydrochloric acid from the reaction system. In this way, the intermediate compound, cyclic phosphate (II), can be produced. Depending upon conditions, the aforesaid basic agent itself may be used as a solvent for the reaction. When the cyclic phosphate (II) is reduced or hydrolyzed, the ester bond between the hydrobenzoin and the phosphoric acid component is ruptured to form a phosphate of the hydroxyl group-containing compound used as the starting material. Reduction for this purpose may most conveniently be effected by bringing the intermediate cyclic phosphate (II) into contact with hydrogen in the presence of a suitable catalyst under atmospheric or reduced pressure. As the catalyst there may be used, for instance, palladium, platinum or nickel catalyst with or without a suitable carrier. Although the reduction can be conducted by means of a metal and an acid or by electrolytic reduction if desired, it is most convenient that the reduction be conducted by means of the catalytic reduction mentioned above. Hydrolysis may be effected by bringing the intermediate cyclic phosphate (II) into contact with water, and it is accelerated by the addition of an acid substance such as hydrochloric acid or sulfuric acid, or by heating. At any rate, in these reactions it is necessary to employ considerably moderate conditions to avoid decomposition of the objective phosphates.

Though the intermediate cyclic phosphate (II) can be isolated from the reaction mixture, it may be reduced or hydrolyzed without isolating from the reaction system. If the starting compound has any hydrolyzable group and if the hydrolyzable group is not changed during the above reduction or hydrolysis, it may further be hydrolyzed through a conventional process if desired. For example, if a hydroxyl group protected by a hydrolyzable blocking group exists in the resulting phosphate, the blocking group can be removed by further hydrolysis.

Products of this invention thus obtained may be isolated as such or as a salt from the reaction mixture utilizing differences between the product and impurities in physico-chemical properties such as solubility, distribution coefficient between two solvents, adsorbability, dialyzability, precipitability, etc.

The following examples are illustrative embodiments of the invention, but they are not intended to limit the scope of this invention. In the examples, the temperatures are all uncorrected, the percentages are all in weight percent, and parts by weight bear the same relation to parts by volume as do grammes to milliliters.

EXAMPLE 1

*Hydrobenzoin cyclic phosphorochloridate*

To a mixture of 7 parts by weight of phosphorus oxychloride and 30 parts by volume of pyridine is added dropwise a solution of 6 parts by weight of dry hydrobenzoin in 110 parts by volume of anhydrous pyridine with stirring, keeping the temperature of the mixture at —15° C. The addition of the solution may be conducted over a period of about 2 hours. After the above treatment, the reaction mixture is stirred for 30 minutes at a temperature of about 15° C. Then the mixture is allowed to stand for 48 hours protected from moisture.

The pyridine hydrochloride separated in the reaction mixture is removed by decantation, and the supernatant is concentrated under reduced pressure on a water bath of which temperature is 15 to 30° C. to obtain a crystalline residue having a low melting point. The product is washed twice with 50 parts by volume each of petroleum ether, and is filtered on a glass-filter avoiding moisture, after which the treatment is repeated. To the washed product is added 50 parts by weight of dried benzene, and the mixture is filtered with a glass-filter. The insoluble matter is washed with 10 parts by volume of benzene. The filtrate is combined with the washings, then 200 parts by volume of petroleum ether is added slowly. The mixture is allowed to stand under ice-cooling to separate white needle-like crystals. After filtering off the crystals, while protecting them from moisture, the product is dried over potassium hydroxide to obtain 8 parts by weight of hydrobenzoin cyclic phosphorochloridate.

*Analysis.*—Calcd. for $C_{14}H_{12}O_3PCl$: C, 57.06%, H, 4.16%. Found: C, 57.47%; H, 4.24%.

EXAMPLE 2

Monomethyl phosphate (a) *Methyl hydrobenzoin cyclic phosphate.*—To a solution of 163 parts by weight of hydrobenzoin cyclic phosphorochloridate and 50 parts by weight of pyridine in 100 parts by volume of benzene is added dropwise under ice cooling 100 parts by volume of methanol. After being kept standing over night at room temperature, the crystalline pyridine hydrochloride separated is filtered off and from the filtrate the solvent is removed by distillation under reduced pressure. The residual oil is mixed with 0.1% aqueous sodium bicarbonate solution and the insoluble matter is centrifuged. The precipitate is washed twice with water and dried in vacuum over phosphorus pentoxide at room temperature. On recrystallization from a mixture of methanol and petroleum ether, the precipitate gives methyl hydrobenzoin cyclic phosphate as prisms melting at 101–102° C.

*Analysis.* — Calcd. for $C_{15}H_{15}O_4P$: C, 62.02%; H, 5.52%. Found: C, 61.99%; H, 5.52%.

The product gives Rf value of 0.95 on paper chromatogram when developed with a solvent system of isopropanol plus 5 N—$NH_4OH$ (2:1).

(b) *Cyclohexylamine methylphosphate.*—A solution of 5 parts by weight of methyl hydrobenzoin cyclic phosphate in 2000 parts by volume of benzene is shaken in a hydrogen stream using 3 parts by weight of palladium-charcoal as a catalyst. When hydrogen consumption is completed (in about one hour), the catalyst is removed by filtration and washed with 2000 parts by volume of water containing 5 parts by weight of cyclohexylamine. The washing is combined with the filtrate and shaken for a while, and the aqueous layer is then separated and lyophilized. The residual colorless crystals are identified with cyclohexylamine methylphosphate which gives Rf value of 0.15 on paper chromatogram when developed with a solvent system of isopropanol plus 5 N–$NH_4OH$ (2:1).

(c) *Monomethyl phosphate.*—A solution of 1 part by weight of methyl hydrobenzoin cyclic phosphate in 300 parts by volume of dioxane is saturated with hydrogen chloride at 37° C. After allowing the mixture to stand overnight, 100 parts by volume of water is added. The mixture is shaken and concentrated under reduced pressure. To the residue 300 parts by volume of benzene and 1 part by weight of cyclohexylamine dissolved in 300 parts by volume of water is added and from the mixture, after shaking, the aqueous layer is separated and lyophilized to obtain the cyclohexylamine salt of methyl phosphate, which is identified with an authentic sample on paper chromatogram developed with solvent system of isopropanol plus 5 N–$NH_4OH$ (2:1) to give the same Rf value of 0.15.

EXAMPLE 3

Glucose-6-phosphate

To a solution of 174 parts by weight of 1,2,3,4-tetraacetylglucose in 1000 parts by volume of pyridine is added under cooling and stirring 165 parts by weight of hydrobenzoin cyclic phosphorochloridate dissolved in 200 parts by volume of pyridine over a period of 30 minutes. After stirring for 15 minutes, the solution is kept standing overnight at 5° C. in an ice box and then for an additional 14 hours at room temperature.

From the mixture, pyridine is removed under reduced pressure to get 500 parts by volume of a residual solution. The condensed solution is poured under stirring into 15,000 parts by volume of ice water to separate a white precipitate which is recovered by filtration and suspended in 10,000 parts by volume of ice water. The suspension is shaken and filtered to obtain a white powder. The solution of the powder in 200 parts by volume of chloroform is dried with sodium sulfate, and to the chloroform solution is added 200 parts by volume of petroleum ether and kept in an ice box overnight to separate colorless needles which are recrystallized from methanol to give pure 1,2,3,4 - tetraacetylglycose - 6 - hydrobenzoin cyclic phosphate melting at 167–169° C. (Yield 111 parts by weight.)

*Analysis.*—Calcd. for $C_{28}H_{31}O_{13}P$: C, 55.44%; H, 5.11%; P, 5.11%. Found: C, 55.69%; H, 5.33%; P, 5.00%.

The product gives Rf value of 0.80 on paper chromatogram developed with a solvent of isopropanol plus 5 N–$NH_4OH$ (2:1).

A solution of 5 parts by weight of 1,2,3,4-tetraacetylglucose-6-hydrobenzoin cyclic phosphate in 400 parts by volume of dry methanol is shaken at room temperature in a hydrogen stream with 2 parts by weight of palladium-charcoal as a catalyst. After removal of the catalyst, the solution is saturated with dried ammonia gas to cause hydrolysis, while warming the solution, and to separate white crystals.

The crystals are separated and identified on paper chromatogram with an authentic specimen of ammonium glucose-6-phosphate using solvent systems of isopropanol plus 5 N–$NH_4OH$ (2:1) and isopropanol plus tert.-butanol plus concentrated $NH_4OH$ plus water (40:20: 1:39) which gives respective RF values of 0.05 and 0.37.

The cyclohexylamine salt of monomethyl phosphate in Example 2 and ammonium glucose-6-phosphate in Example 3 may further be converted into respective phosphates by per se known methods, e.g. a method utilizing acidic cation exchange resin such as "Amberlite IR–120 (H+) (Rohm & Haas Co., U.S.A.)."

EXAMPLE 4

Adenosine-5'-monophosphate

A solution of 1 part by weight of dried 2',3'-O-isopropylideneadenosine in 6 parts by volume of pyridine is frozen in a Dry Ice-acetone bath, and has added a solution of 2 parts by weight of freshly prepared hydrobenzoin cyclic phosphorochloridate in 5 parts by volume of dried pyridine. The mixture is stirred for 2 hours at a temperature of −30° C. and is allowed to stand overnight at a temperature of −5° C. A solution of 1 part by weight of sodium bicarbonate in 7 parts by volume of water is added to the above reaction mixture under ice cooling and is shaken. After the removal of the solvent under reduced pressure, 10 parts by volume of water is added to the residue and the treatment is repeated twice for complete removal of pyridine.

The residual white mass is dissolved in 20 parts by volume of water and the solution is extracted five times with, each time, a 20 parts by volume portion of chloroform to separate unreacted isopropylideneadenosine. The aqueous layer which contains 2',3'-O-isopropylideneadenosine-5'-hydrobenzoin cyclic phosphate is neutralized with ion exchange resin ("Dowex 50" (H+) (Dow Chemical Co., U.S.A.)) and the solution is subjected to catalytic hydrogenation using palladium-charcoal as catalyst to complete the consumption of hydrogen. After the removal of the catalyst, the filtrate is lyophilized to obtain a syrupy residue which is dissolved in 20 parts by volume of water and a saturated aqueous solution of barium hydroxide is added to make pH 10.

The precipitate separated is removed by concentration, and to the supernatant 40 parts by volume of 0.1 N—$H_2SO_4$ is added. The acidic solution is kept standing for two days at room temperature and subjected to paper chromatography using solvent systems of isopropanol plus concentrated aqueous ammonia (density: 0.90) plus water (7:1:2) (solvent I) and n-propanol plus concentrated aqueous ammonia (density: 0.90) plus water (20:10:3) (solvent II). Each of the paper chromatograms obtained with the solvent systems I and II shows single spot with respective Rf-values of 0.13 and 0.38 which are identical with those obtained with an authentic specimen of adenosine-5'-monophosphate with the same solvent systems.

Although the hydroxyl group-containing compounds set forth in Examples 2 to 4 inclusive represent presently preferred alcohols for carrying out the process of the invention, it will be understood that the invention is generally applicable to hydroxyl group-containing compounds such as ribose, deoxyribose, mannose, gentiobiose, sucrose, guanosine, citidine, uridine, thimidine, 2'-deoxythimidine, ethanol, propanol, butanol, vitamin A alcohol, thiamine, riboflavine and steroid alcohols.

The hydrobenzoin employed in the process of the present invention is the optically inactive meso-form, having a melting point of 134–138° C.

Having thus disclosed the invention, what is claimed is:

1. A process for preparing an alcohol phosphate, which comprises reacting an alcohol with hydrobenzoin cyclic phosphorochloridate, thereby producing a cyclic phosphate of the formula

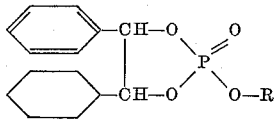

wherein R is the residue of the alcohol, and removing the hydrobenzoin moiety from the said cyclic phosphate by the action thereon of hydrogen in the presence of a hydrogenation catalyst.

2. A process according to claim 1, wherein the reaction between the alcohol and the hydrobenzoin cyclic phosphorochloridate is carried out in the presence of a pyridine base in the reaction mixture.

3. A process according to claim 2, wherein the pyridine base is pyridine.

4. A process according to claim 2, wherein the pyridine base is picoline.

5. A process according to claim 1, wherein the catalyst is palladium.

6. A process according to claim 1, wherein the catalyst is platinum.

7. A process according to claim 1, wherein the catalyst is nickel.

8. A process for preparing an alcohol phosphate, which comprises reacting an alcohol with hydrobenzoin cyclic phosphorochloridate, thereby producing a cyclic phosphate of the formula

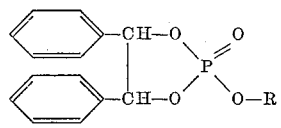

wherein R is the residue of the alcohol, and removing the hydrobenzoin moiety from the said cyclic phosphate by the action thereon of aqueous acid, as hydrolyzing agent.

9. A process according to claim 8, wherein the hydrolyzing agent is aqueous hydrochloric acid.

10. A process according to claim 8, wherein the hydrolyzing agent is aqueous sulfuric acid.

11. A process for producing glucose-6-phosphate, which comprises reacting 1,2,3,4-tetraacetylglucose with hydrobenzoin cyclic phosphorochloridate in the presence of pyridine, whereby 1,2,3,4-tetraacetylglucose-6-hydrobenzoin cyclic phosphate is produced, reducing the latter compound with hydrogen in the presence of palladium catalyst, and then hydrolyzing the product with ammonia to form the desired glucose-6-phosphate.

12. Hydrobenzoin cyclic phosphorochloridate.

13. Methyl hydrobenzoin cyclic phosphate.

14. 1,2,3,4 - tetraacetylglucose - 6 - hydrobenzoin phosphate.

15. A process for producing adenosine-5'-monophosphate, which comprises reacting 2',3'-O-isopropylideneadenosine with hydrobenzoin cyclic phosphorochloridate in the presence of pyridine, whereby 2',3'-O-isopropylideneadenosine-5'-hydrobenzoin cyclic phosphate is produced, reducing the latter compound with hydrogen in the presence of palladium catalyst, and then hydrolyzing the product with barium hydroxide to form the desired adenosine-5'-monophosphate.

16. 2',3'-O-isopropylideneadenosine - 5' - hydrobenzoin cyclic phosphate.

References Cited in the file of this patent

MacDonald et al.: J. Am. Chem. Soc. 78, 3720–3722 (1956).

Ukita et al.: J. Am. Chem. Soc. 80, 1373–1376 (Mar. 20, 1958).